US011624537B2

(12) United States Patent
Attari et al.

(10) Patent No.: US 11,624,537 B2
(45) Date of Patent: Apr. 11, 2023

(54) CLIMATE-CONTROL SYSTEM AND METHOD OF CONTROLLING THE SYSTEM

(71) Applicant: Emerson Climate Technologies, Inc., Sidney, OH (US)

(72) Inventors: Babak Attari, Fairborn, OH (US); Reza Khatami, Centerville, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 252 days.

(21) Appl. No.: 17/065,117

(22) Filed: Oct. 7, 2020

(65) Prior Publication Data

US 2022/0107124 A1 Apr. 7, 2022

(51) Int. Cl.
*F25B 49/02* (2006.01)
*F25B 30/02* (2006.01)
(Continued)

(52) U.S. Cl.
CPC ............. *F25B 49/02* (2013.01); *F25B 30/02* (2013.01); *F25B 39/04* (2013.01); *F25B 41/20* (2021.01);
(Continued)

(58) Field of Classification Search
CPC .......... F25B 49/02; F25B 41/20; F25B 30/02; F25B 39/04; F25B 2700/21; F25B 2700/15; F25B 2600/2515; F25B 2500/27
See application file for complete search history.

(56) References Cited

U.S. PATENT DOCUMENTS 4,278,697 A 7/1981 Liebermann
4,623,780 A 11/1986 Shelton
(Continued)

FOREIGN PATENT DOCUMENTS

| CN | 108180675 A | 6/2018 |
| GB | 2527013 A | 12/2015 |
| JP | 6207600 B2 | 10/2017 |

OTHER PUBLICATIONS

International Search Report regarding Application No. PCT/US2021/053910 dated Jan. 20, 2022.
(Continued)

*Primary Examiner* — Nael N Babaa
(74) *Attorney, Agent, or Firm* — Harness, Dickey & Pierce, P.L.C.

(57) ABSTRACT

A system includes a heat-pump circuit and a heating-fluid circuit. The heat-pump circuit includes a compressor and a first condenser conduit. The heating-fluid circuit includes first, second, and third flow-paths. The third flow-path selectively communicates with the first and second flow-paths. The first flow-path includes a first valve. The first valve moves between an open position allowing fluid flow through the first flow-path and a closed position restricting fluid flow through the first flow-path. The second flow-path includes a second condenser conduit and a second valve. When the second valve is open, fluid flows through the second flow-path. In the closed position, the second valve restricts fluid flow through the second flow-path. The third flow-path includes a heat exchanger receiving fluid from the first flow-path when the first valve is in the open position and receiving fluid from the second flow-path when the second valve is in the open position.

22 Claims, 3 Drawing Sheets

(51) Int. Cl.
*F25B 39/04* (2006.01)
*F25B 41/20* (2021.01)
*F25B 41/40* (2021.01)

(52) U.S. Cl.
CPC .......... *F25B 41/40* (2021.01); *F25B 2500/27* (2013.01); *F25B 2600/2501* (2013.01); *F25B 2600/2515* (2013.01); *F25B 2700/15* (2013.01); *F25B 2700/21* (2013.01)

(56) References Cited

U.S. PATENT DOCUMENTS

| | | | |
|---|---|---|---|
| 5,365,039 A | 11/1994 | Chaudoir | |
| 7,089,850 B2 | 8/2006 | Lee et al. | |
| 8,450,659 B2 | 5/2013 | Theodos et al. | |
| 8,558,142 B2 | 10/2013 | Theodos et al. | |
| 9,140,485 B2 | 9/2015 | Veltrop | |
| 9,723,950 B2 | 8/2017 | Tippman et al. | |
| 10,034,575 B2 | 7/2018 | Veltrop | |
| 2008/0178613 A1 | 7/2008 | Smith | |
| 2011/0197600 A1 | 8/2011 | Hamada et al. | |
| 2019/0301752 A1 | 10/2019 | Horie et al. | |
| 2019/0353361 A1* | 11/2019 | Attari | F24F 11/65 |
| 2020/0033038 A1 | 1/2020 | Popli et al. | |

OTHER PUBLICATIONS

Written Opinion of the ISA regarding Application No. PCT/US2021/053910 dated Jan. 20, 2022.

* cited by examiner

CLIMATE-CONTROL SYSTEM AND METHOD OF CONTROLLING THE SYSTEM

FIELD

The present disclosure relates to a climate-control system and a method of controlling the system.

BACKGROUND

This section provides background information related to the present disclosure and is not necessarily prior art.

Many restaurants use UHC (universal holding cabinet) units to store cooked food products and maintain a desired temperature of the food products until the food products are served to restaurant patrons. Such UHC units can be heated by heat-pump systems. Such systems typically require a large amount of energy to operate. The present disclosure provides an improved UHC-heating system that can operate in a mode that consumes less energy while still actively heating the UHC units. Such energy savings can result in significant cost savings for the restaurant owner and can reduce strain on the power grid.

SUMMARY

This section provides a general summary of the disclosure, and is not a comprehensive disclosure of its full scope or all of its features.

In one form, the present disclosure provides a system that may include a heat-pump circuit and a heating-fluid circuit. The heat-pump circuit may include a compressor, a first condenser conduit, an expansion device, and an evaporator. The compressor may be configured to circulate a working fluid through the heat-pump circuit. The heating-fluid circuit may be fluidly isolated from the heat-pump circuit and may be in a selective heat-transfer relationship with the heat-pump circuit. The heating-fluid circuit may include a first flow-path, a second flow-path, and a third flow-path in selective fluid communication with the first and second flow-paths. The first flow-path may include a first valve and a fluid storage tank. The first valve may be movable between an open position allowing fluid flow through the first flow-path and a closed position restricting fluid flow through the first flow-path. The second flow-path may include a second condenser conduit and a second valve. The second condenser conduit may be in a heat-transfer relationship with the first condenser conduit. The second valve may be movable between an open position allowing fluid flow through the second flow-path and a closed position restricting fluid flow through the second flow-path. The third flow-path may include a heat-exchanger conduit that is configured to receive fluid from the first flow-path when the first valve is in the open position and to receive fluid from the second flow-path when the second valve is in the open position. Fluid communication between the heat-exchanger conduit and the first flow-path may be restricted when the first valve is in the closed position. Fluid communication between the heat-exchanger conduit and the second flow-path may be restricted when the second valve is in the closed position.

In some configurations of the system of the above paragraph, a first fluid is circulated through the heat-pump circuit, and a second fluid is circulated through the heating-fluid circuit. The first fluid is a different substance than the second fluid.

In some configurations of the system of either of the above paragraphs, the first fluid is a refrigerant.

In some configurations of the system of any of the above paragraphs, the second fluid is water.

In some configurations of the system of any of the above paragraphs, the system includes a control module in communication with the compressor, the first valve, and the second valve. The control module may be configured to receive a signal from a utility provider that provides electrical power to a power grid. The control module may be configured to control the compressor, the first valve, and the second valve based on the signal received from the utility provider.

In some configurations of the system of any of the above paragraphs, the control module is configured to operate the system in a first mode and in a second mode.

In some configurations of the system of any of the above paragraphs, a capacity of the compressor is higher in the first mode than in the second mode.

In some configurations of the system of any of the above paragraphs, the control module switches between the first and second modes based on the signal received from the utility provider.

In some configurations of the system of any of the above paragraphs, the compressor is shut down in the second mode.

In some configurations of the system of any of the above paragraphs, the compressor operates at a partial capacity in the second mode.

In some configurations of the system of any of the above paragraphs, in the first mode, the control module is configured to: move the first valve to restrict fluid flow through the first flow-path, and move the second valve to the open position to allow fluid flow through the second flow-path.

In some configurations of the system of any of the above paragraphs, in the second mode, the control module is configured to: move the first valve to the open position allow fluid flow through the first flow-path, and move the second valve to restrict fluid flow through the second flow-path.

In some configurations of the system of any of the above paragraphs, the heating-fluid circuit includes a third valve that is movable between a first position allowing fluid flow through the heat-exchanger conduit and a second position restricting fluid flow through the heat-exchanger conduit. The control module may be configured to switch the system to a third mode in which the third valve is moved to the second position.

In some configurations of the system of any of the above paragraphs, the control module is configured to move the first and second valves to the open position in the third mode.

In some configurations of the system of any of the above paragraphs, the heat-exchanger conduit is in a heat-transfer relationship with an enclosed space such that fluid flowing through the heat-exchanger conduit transfers heat to the enclosed space. The control module may be configured to switch the system to the third mode in the absence of a heating demand for the enclosed space and when a temperature of fluid in the fluid storage tank is below a predetermined temperature.

In some configurations of the system of any of the above paragraphs, the heating-fluid circuit includes a pump that circulates fluid through the heating-fluid circuit.

In some configurations of the system of any of the above paragraphs, the heat-exchanger conduit is in a heat-transfer relationship with an enclosed space such that fluid flowing through the heat-exchanger conduit transfers heat to the enclosed space.

In some configurations of the system of any of the above paragraphs, the enclosed space is a universal holding cabinet configured to contain pre-cooked food products to maintain the food products at a serving temperature.

In another form, the present disclosure provides a method of operating a system for heating an enclosed space. The system may include a heat-pump circuit and a heating-fluid circuit that is in a selective heat-transfer relationship with the heat-pump circuit. The method may include operating the system in a first mode in which the heat-pump circuit operates at a first capacity and fluid in the heating-fluid circuit absorbs heat from working fluid in the heat-pump circuit, wherein fluid in the heating-fluid circuit is fluidly isolated from working fluid in the heat-pump circuit; receiving a signal from a utility provider indicative of a period of high demand for electrical power in a power grid; switching the system from the first mode to a second mode in which power consumption of the heat-pump circuit is reduced and at least a portion of the fluid circulating in the heating-fluid circuit bypasses a condenser of the heat-pump circuit and flows through a fluid storage tank of the heating-fluid circuit; and directing fluid in the heating-fluid circuit through a heat-exchanger conduit during the first mode and during the second mode, wherein the heat-exchanger conduit is in a heat-transfer relationship with the enclosed space.

In some configurations of the method of the above paragraph, the heating-fluid circuit includes: a first flow-path including a first valve and a fluid storage tank, wherein the first valve is movable between an open position allowing fluid flow through the first flow-path and a closed position restricting fluid flow through the first flow-path; and a second flow-path including a second condenser conduit and a second valve, wherein the second condenser conduit is in a heat-transfer relationship with a first condenser conduit of the heat-pump circuit, and wherein the second valve is movable between an open position allowing fluid flow through the second flow-path and a closed position restricting fluid flow through the second flow-path.

In some configurations of the method of either of the above paragraphs, the second valve is in the open position when the system is operating in the first mode.

In some configurations of the method of any of the above paragraphs, the first valve is in the open position when the system is operating in the second mode.

In some configurations of the method of any of the above paragraphs, switching the system to the second mode includes shutting down the compressor.

In some configurations of the method of any of the above paragraphs, switching the system to the second mode includes operating the compressor at a lower capacity than a capacity at which the compressor operates in the first mode.

In some configurations of the method of any of the above paragraphs, the second valve is in the closed position when the system is operating in the second mode.

In some configurations of the method of any of the above paragraphs, the first valve is in the closed position when the system is operating in the first mode.

In some configurations of the method of any of the above paragraphs, the enclosed space is a universal holding cabinet configured to contain pre-cooked food products to maintain the food products at a serving temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
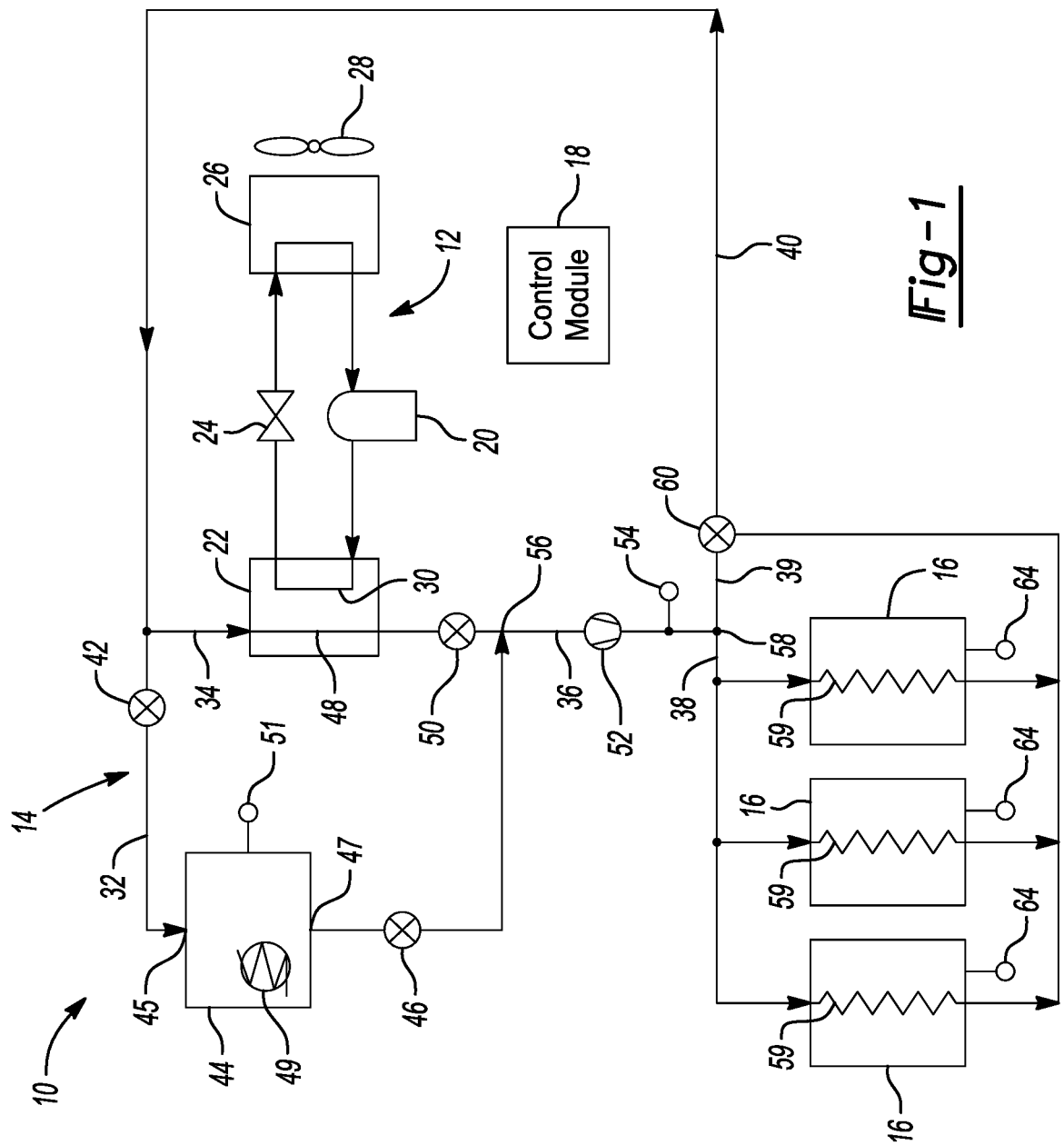
FIG. 1 is a schematic representation of a system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a system 10 is provided that may include a heat-pump circuit 12 and a heating-fluid circuit 14. The heat-pump circuit 12 may circulate a working fluid (e.g., a refrigerant). The heating-fluid circuit 14 may circulate a fluid (e.g., water or another suitable fluid) that may be fluidly isolated from the working fluid in the heat-pump circuit 12. As will be described in more detail below, the heating-fluid circuit 14 may be in a heat-transfer relationship with the heat-pump circuit 12 and may be in a heat-transfer relationship with one or more enclosed spaces such as UHC (universal holding cabinet) units 16 or other food holding/heating compartments, for example. The UHC units 16 may be disposed inside of and/or be a part of a restaurant, a food truck, or a food service kiosk, for example, or any other food preparation/service location. The system 10 is operable to transfer heat to the UHC units 16 so that the UHC units 16 may heat the food products and/or maintain the food products at a desired heated temperature until the food products are served to a patron. A control module 18 is configured to control the system 10 to selectively heat the UHC units 16 to a desired temperature and is configured to selectively reduce energy consumption of the system 10 during high energy-demand periods (i.e., periods in which an energy utility provider's power grid experiences high demand for electrical energy) while still allowing the system 10 to provide adequate heating capacity to maintain the UHC units 16 at the desired temperatures.

The heat-pump circuit 12 may include a compressor 20, a condenser 22, an expansion device 24 (e.g., an expansion valve or capillary tube), an evaporator 26, and an evaporator fan 28. The compressor 20 draws in suction-pressure working fluid and compresses the working fluid to a discharge pressure. The discharge-pressure working fluid may flow through a first conduit 30 of the condenser 22 where heat from the working fluid can be transferred to fluid in the heating-fluid circuit 14. Working fluid may exiting the first conduit 30 of the condenser 22 may flow through the expansion device 24, which lowers the temperature and pressure of the working fluid. The working fluid flows from the expansion device 24 to the evaporator 26 where the working fluid may absorb heat from air that may be forced across the evaporator 26 by the evaporator fan 28. In some configurations, the evaporator fan 28 can force hot air from a waste-heat source (e.g., heat from fryers or ovens of a restaurant, a computer server room of the restaurant, warm air from an interior or exterior of the restaurant, an engine of a food truck, or any other source of waste heat). From the evaporator 26, the working fluid may flow back into the compressor 20 to repeat the cycle described above.

The heating-fluid circuit 14 may include a first flow path (condenser-bypass flow-path) 32, a second flow-path (condenser-heat-exchange flow-path) 34, a third flow-path (supply flow-path) 36, a fourth flow-path (UHC-heat-exchange flow-path) 38, a fifth flow-path (UHC-bypass flow-path) 39, and a sixth flow-path (return flow-path) 40. The condenser-bypass flow-path 32 may include a first bypass valve 42, a heating-fluid storage tank 44, and a second bypass valve 46. The valves 42, 46 are both movable between open and closed positions. When the valves 42, 46 are in the open position, fluid is allowed to flow from the return flow-path 40, through the bypass valve 42, into an inlet 45 of the heating-fluid storage tank 44, through an outlet 47 of the heating-fluid storage tank 44, through the second bypass valve 46, and into the supply flow-path 36. The heating-fluid storage tank 44 may include a booster heater 49 (e.g., an electric resistive heater or other suitable type of heater) that is operable to heat the fluid in the heating-fluid storage tank 44. The heating-fluid storage tank 44 may also include a temperature sensor 51 that can measure a temperature of the fluid in the heating-fluid storage tank 44.

The condenser-heat-exchange flow-path 34 may include a second conduit 48 of the condenser 22 and a control valve 50. The second conduit 48 is in a heat-transfer relationship with the first conduit 30 of the condenser 22. Fluid flowing through the second conduit 48 may absorb heat from working fluid in the first conduit 30 of the condenser 22. The fluid in the second conduit 48 may be fluidly isolated from working fluid in the first conduit 30 of the condenser 22. The control valve 50 may be disposed downstream of the second conduit 48. The control valve 50 may be movable between an open position (to allow fluid flow through the condenser-heat-exchange flow-path 34 and allow fluid communication between the condenser-heat-exchange flow-path 34 and the supply flow-path 36) and a closed position (to restrict or prevent fluid flow through the condenser-heat-exchange flow-path 34 and restrict or prevent fluid communication between the condenser-heat-exchange flow-path 34 and the supply flow-path 36).

The supply flow-path 36 may include a pump 52 and a temperature sensor 54. The supply flow-path 36 may be disposed may extend from an intersection 56 of the condenser-bypass flow-path 32 and the condenser-heat-exchange flow-path 34 to an intersection 58 of the UHC-heat-exchange flow-path 38 and the UHC-bypass flow-path 39. The supply flow-path 36 is in selective fluid communication with the condenser-bypass flow-path 32, the condenser-heat-exchange flow-path 34, the UHC-heat-exchange flow-path 38, and the UHC-bypass flow-path 39.

The UHC-heat-exchange flow-path 38 is in a heat-transfer relationship with the UHC units 16. That is, the UHC-heat-exchange flow-path 38 may include a plurality of heat-exchanger conduits 59, each of which are in a heat-transfer relationship with a respective one of the UHC units 16. Each of the UHC units 16 may include a temperature sensor 64 that may measure an air temperature inside of a food-storage compartment of the UHC unit 16. The UHC-heat-exchange flow-path 38 may extend from the intersection 58 to a control valve 60.

The control valve 60 may be a three-way valve that is movable between a first position and a second position. In the first position, the control valve 60 may allow fluid communication between the UHC-heat-exchange flow-path 38 and the return flow-path 40 and restrict or prevent fluid communication between the UHC-bypass flow-path 39 and the return flow-path 40. In the second position, the control valve 60 may allow fluid communication between the UHC-bypass flow-path 39 and the return flow-path 40 and restrict or prevent fluid communication between the UHC-heat-exchange flow-path 38 and the return flow-path 40. The return flow-path 40 may receive fluid from the control valve 60 and provide the fluid to the condenser-bypass flow-path 32 and/or the condenser-heat-exchange flow-path 34. The valves 42, 46, 50, 60 can be solenoid valves or any other suitable type of valve.

Figure 2:
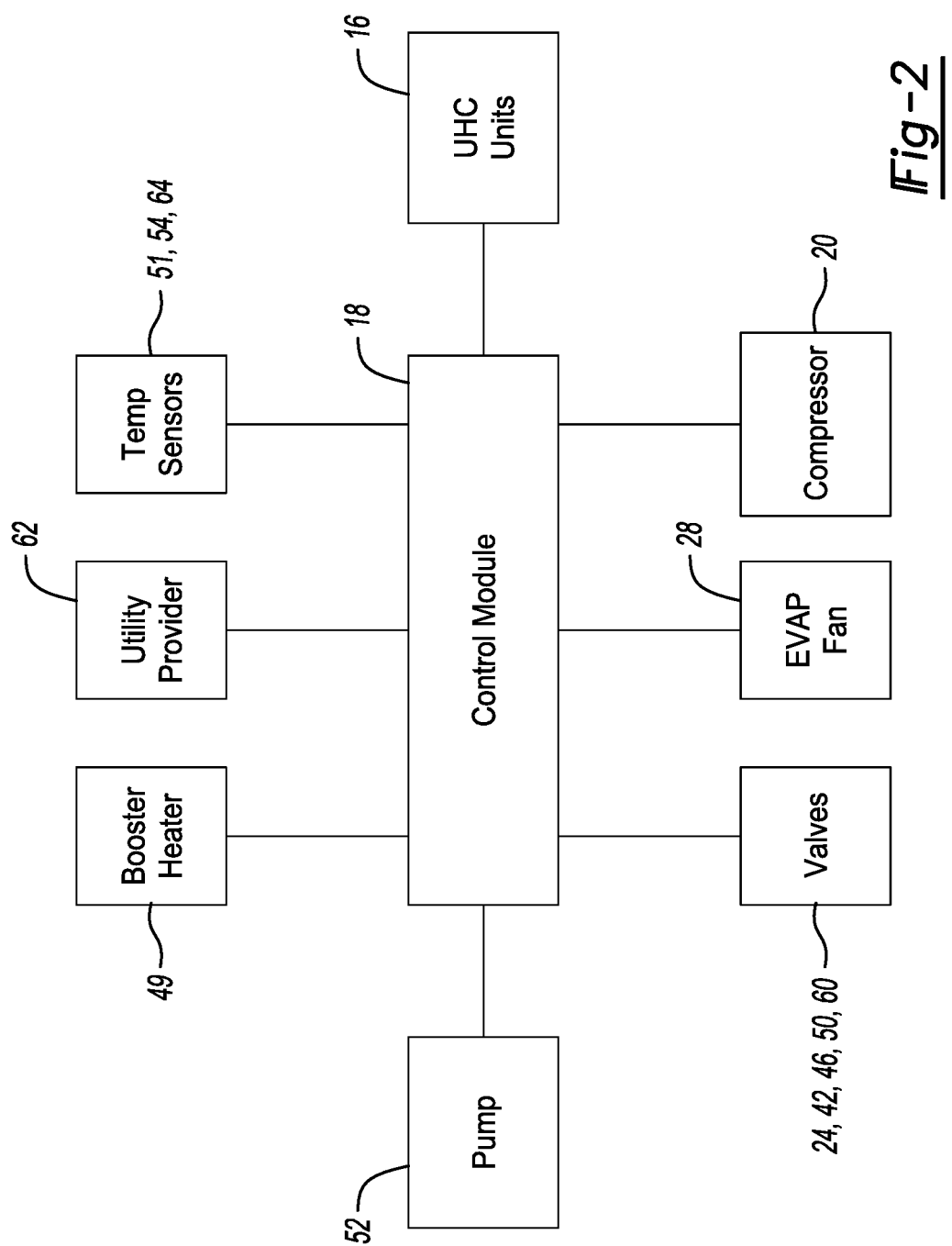
FIG. 2 is a block diagram of illustrating signal connectivity among components of the system of FIG. 1.

As shown in FIG. 2, the control module 18 is in communication with the temperature sensors 51, 54, 64, the UHC units 16, the compressor 20, the evaporator fan 28, the valves 24, 42, 46, 50, 60, the pump 52, the booster heater 49, and a utility provider 62 (e.g., a company or organization that provides electrical power to a power grid from which the system 10 (and the restaurant or building in which the UHC units 16 are installed) draws electrical power). The control module 18 is configured to receive signals from the utility provider 62 and from the temperature sensors 51, 54, 64. The control module 18 is configured to control operation of the compressor 20, the evaporator fan 28, the valves 24, 42, 46, 50, 60, the pump 52, and the booster heater 49.

The control module 18 is configured to switch operation of the system 10 among a first mode (a normal mode), a second mode (a reduced-capacity mode), and a third mode (a charge mode). In the normal mode, the heat-pump circuit 12 is operated at full or high capacity so that the system 10 can heat the UHC units 16 at an elevated level. In the reduced-capacity mode, the system 10 consumes less energy than the normal mode but still provides some level of heating for the UHC units 16. In the charge mode, the system 10 pre-heats the heating fluid in the heating-fluid circuit 14

In the normal mode, the control module 18 may operate the compressor 20 and evaporator fan 28 at full capacity (or at a relatively high capacity), move the valves 42, 46 to closed positions (to restrict or prevent fluid flow through the condenser-bypass flow-path 32), move the control valve 50 to the open position (to allow fluid flow through the condenser-heat-exchange flow-path 34), and move the control valve 60 to the first position (to allow fluid communication between the UHC-heat-exchange flow-path 38 and the return flow-path 40 and restrict or prevent fluid communication between the UHC-bypass flow-path 39 and the return flow-path 40). In other words, in the normal mode, the control module 18 operates the heat-pump circuit 12 (at full or high capacity) while simultaneously operating the pump 52 to cause fluid to flow through the condenser-heat-exchange flow-path 34 (such that fluid in the second conduit 48 absorbs heat from working fluid in the first conduit 30), through the UHC-heat-exchange flow-path 38 (such that heat is transferred from the fluid in the UHC-heat-exchange flow-path 38 to the UHC units 16), through the return flow-path 40, and back through the condenser-heat-exchange flow-path 34. In the normal mode, fluid in the heating-fluid circuit 14 is prevented (or restricted) from bypassing the second conduit 48 of the condenser 22 through the condenser-bypass flow-path 32 and is prevented (or restricted) from bypassing the UHC units 16 through the UHC-bypass flow-path 39. In some configurations, the control module 18 may selectively operate the booster heater 49 during the normal mode to maintain the temperature of the fluid in the heating-fluid storage tank 44 at or above a predetermined temperature. Furthermore, in some configurations, the control module 18 may selectively move the bypass valves 42, 46 to partially open positions during the normal mode to allow for some amount of heating of the fluid in the heating-fluid storage tank 44.

In the reduced-capacity mode, the control module 18 may shutdown the compressor 20 and evaporator fan 28 (or operate the compressor 20 and evaporator fan 28 at a reduced capacity or relatively low capacity), move the valves 42, 46 to open positions (to allow fluid flow through the condenser-bypass flow-path 32), move the control valve 50 to the closed or partially closed position (to prevent or restrict fluid flow through the condenser-heat-exchange flow-path 34), and move the control valve 60 to the first position (to allow fluid communication between the UHC-heat-exchange flow-path 38 and the return flow-path 40 and restrict or prevent fluid communication between the UHC-bypass flow-path 39 and the return flow-path 40). In other words, in the reduced-capacity mode, the control module 18 reduces energy-consumption of the heat-pump circuit 12 (by shutting down or reducing capacity of the heat-pump circuit 12) and operates the pump 52 to cause fluid to flow through the condenser-bypass flow-path 32, through the UHC-heat-exchange flow-path 38 (such that heated fluid from the heating-fluid storage tank 44 can be transferred to the UHC units 16), through the return flow-path 40, and back through the condenser-bypass flow-path 32. In the normal mode, fluid in the heating-fluid circuit 14 may bypass the second conduit 48 of the condenser 22 through the condenser-bypass flow-path 32 and is prevented (or restricted) from bypassing the UHC units 16 through the UHC-bypass flow-path 39. In this manner, the system 10 can still heat the UHC units 16 while reducing energy-consumption of the system 10 (by shutting down or reducing capacity of the heat-pump circuit 12).

In the charge mode, the control module 18 may operate the heat-pump circuit 12 to heat the fluid in the heating-fluid circuit 14 while allowing the fluid in the heating-fluid circuit 14 to bypass the UHC units 16. That is, in the charge mode, the control module may operate the compressor 20 and evaporator fan 28 at full capacity (or at a relatively high capacity), move the bypass valves 42, 46 to open positions (to allow fluid flow through the condenser-bypass flow-path 32), move the control valve 50 to the open position (to allow fluid flow through the condenser-heat-exchange flow-path 34), and move the control valve 60 to the second position. With the control valve 60 in the second position, fluid communication between the UHC-heat-exchange flow-path 38 and the return flow-path 40 is restricted or prevent (i.e., to restrict or prevent heat transfer to the UHC units 16) and fluid communication between the UHC-bypass flow-path 39 and the return flow-path 40 is allowed. In other words, in the charge mode, the control module 18 operates the heat-pump circuit 12 (at full or high capacity) while simultaneously operating the pump 52 to: cause some fluid to flow through the condenser-heat-exchange flow-path 34 (such that fluid in the second conduit 48 absorbs heat from working fluid in the first conduit 30); cause some fluid to flow through the condenser-bypass fluid-path 32 (to replenish the heating-fluid storage tank 44 with heated fluid); bypass the UHC-heat-exchange flow-path 38 and the UHC units 16; and flow through the return flow-path 40 back through condenser-bypass flow-path 32 and the condenser-heat-exchange flow-path 34.

Figure 3:
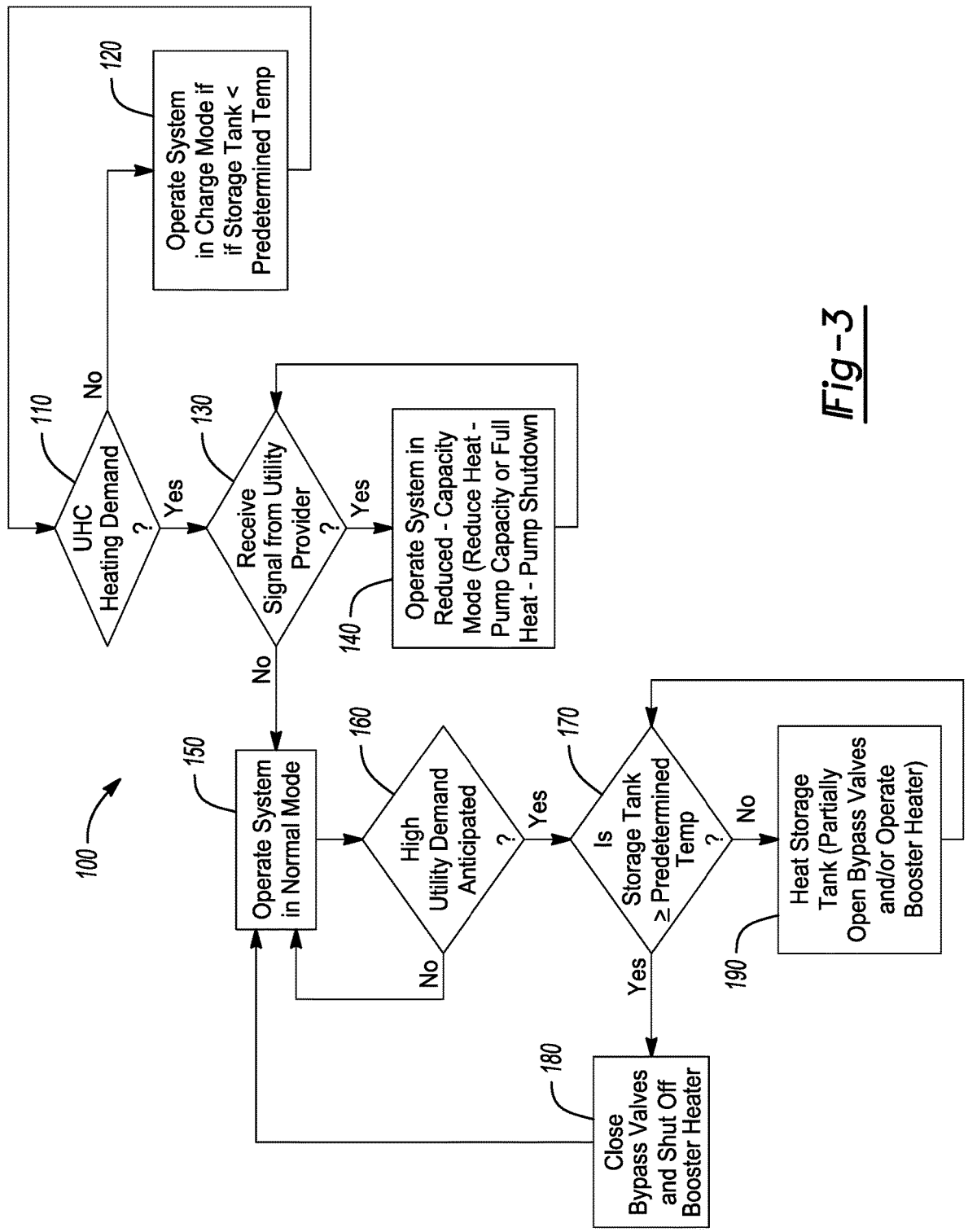
FIG. 3 is a flow chart illustrating a method of controlling the system of FIG. 1.

Referring now to FIG. 3, a method 100 of operating the system 10 will be described. At step 110, the control module 18 may determine (e.g., based on data received from the temperature sensors 64 or thermostats of the UHC units 16) whether there is a demand for heating of the UHC units 16 (i.e., whether the air temperatures within the UHC units 16 are below a predetermined temperature). If there is no current demand for heating of the UHC units 16, the control module 18 may, at step 120, operate the system 10 in the charge mode if the temperature of the fluid within the heating-fluid storage tank 44 (e.g., as measured by the temperature sensor 51) is below a predetermined temperature. The control module 18 may continue to operate the system 10 in the charge mode until the temperature of the fluid within the heating-fluid storage tank 44 reaches the predetermined temperature or until the control module 18 determines that there is a demand for heating of the UHC units 16.

If, at step 110, the control module 18 determines that there is a current demand for heating of the UHC units 16 (i.e., if the control module 18 receives a demand signal for heating the UHC units 16), the control module 18 may determine, at step 130, whether the utility provider 62 has sent a DR (demand response) signal to the control module 18 indicating that the utility provider's power grid is currently experiencing a period of high demand for power. If the control module 18 determines at step 130 that a DR signal has been received by the control module 18, then the control module 18 may operate the system 10 in the reduced-capacity mode at step 140. The control module 18 may continue to operate the system 10 in the reduced-capacity mode until there is no longer a demand for heating the UHC units 16 or until the period of high demand for power ends (at which time, the control module 18 may switch the system to the normal mode). If the control module 18 determines at step 130 that a DR signal has not been received by the control module 18 (or that the period of high demand for power has ended), then the control module 18 may operate the system 10 in the normal mode at step 150.

The control module 18 is configured to selectively raise the temperature of fluid in the heating-fluid storage tank 44 (at step 180) during operation of the system 10 in the normal mode. For example, while operating the system 10 in the normal mode, the control module 18 may determine, at step 160, whether a period of high power demand is anticipated within a predetermined amount of time (i.e., whether a DR signal is expected to be received in the near future (such as within the next 1-2 hours, for example)). If a DR signal is anticipated within the predetermined amount of time, the control module 18 may determine, at step 170, whether fluid in the heating-fluid storage tank 44 is greater than or equal to a predetermined temperature (e.g., based on data from the temperature sensor 51). If the control module 18 determines at step 170 that the fluid in the heating-fluid storage tank 44 is greater than or equal to the predetermined temperature, then the control module 18 may, at step 180, fully close (or keep fully closed) the bypass valves 42, 46 and shut down (or keep shut down) the booster heater 49. If the control module 18 determines at step 170 that the fluid in the heating-fluid storage tank 44 is less than the predetermined temperature, then the control module 18 may partially open the bypass valves 42, 46 and/or turn on the booster heater 49 at step 190. This will allow the system 10 to raise the temperature of the fluid in the heating-fluid storage tank 44 so that the heating-fluid circuit 14 has sufficient heating capacity to heat the UHC units 16 without operating the heat-pump circuit 12 (or while only operating the heat-pump circuit 12 at reduced capacity) when the next DR signal is received from the utility provider 62.

The system 10 and method 100 provide for effective and efficient heating of the UHC units while reducing energy consumption during periods of high energy-demand. The system 10 and method 100 can result in significant cost savings for restaurant (or other business) owners/operators by significantly reducing energy consumption during periods of high energy demand in a given power grid while still adequately heating the UHC units 16 to maintain food products (or other perishable products) within the UHC units 16 at desired temperatures.

In this application, the term "module" or "control module" may be replaced with the term "circuit." The term "module" or "control module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term "code," as used above, may include software, firmware, and/or microcode, and may refer to programs, routines, functions, classes, data structures, and/or objects. The term "shared processor circuit" encompasses a single processor circuit that executes some or all code from multiple modules. The term "group processor circuit" encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term "shared memory circuit" encompasses a single memory circuit that stores some or all code from multiple modules. The term "group memory circuit" encompasses a memory circuit that, in combination with additional memories, stores some or all code from one or more modules.

The term "memory circuit" is a subset of the term computer-readable medium. The term "computer-readable medium," as used herein, does not encompass transitory electrical or electromagnetic signals propagating through a medium (such as on a carrier wave); the term "computer-readable medium" may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112 (f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
    a heat-pump circuit including a compressor and a condenser having a first condenser conduit, wherein the first condenser conduit is in fluid communication with the compressor, and wherein the compressor is configured to circulate a working fluid through the heat-pump circuit; and
    a heating-fluid circuit fluidly isolated from the heat-pump circuit and in a selective heat-transfer relationship with the heat-pump circuit, wherein the heating-fluid circuit includes a first flow-path, a second flow-path, and a third flow-path in selective fluid communication with the first and second flow-paths,
    wherein the first flow-path includes a first valve and a fluid storage tank, the first valve is movable between an open position allowing fluid flow through the first flow-path and a closed position restricting fluid flow through the first flow-path,
    wherein the second flow-path includes a second condenser conduit and a second valve, the second condenser conduit is in a heat-transfer relationship with the first condenser conduit, the second valve is movable between an open position allowing fluid flow through the second flow-path and a closed position restricting fluid flow through the second flow-path,
    wherein the third flow-path includes a heating unit having a heat-exchanger conduit, wherein the heat-exchanger conduit is configured to receive fluid from the first flow-path when the first valve is in the open position and to receive fluid from the second flow-path when the second valve is in the open position,
    wherein fluid communication between the heat-exchanger conduit and the first flow-path is restricted when the first valve is in the closed position, and
    wherein fluid communication between the heat-exchanger conduit and the second flow-path is restricted when the second valve is in the closed position.

2. The system of claim 1, wherein a first fluid is circulated through the heat-pump circuit, wherein a second fluid is circulated through the heating-fluid circuit, and wherein the first fluid is a different substance than the second fluid.

3. The system of claim 2, wherein the first fluid is a refrigerant, and wherein the second fluid is water.

4. The system of claim 1, further comprising a control module in communication with the compressor, the first valve, and the second valve, wherein the control module is configured to receive a signal from a utility provider that provides electrical power to a power grid, and wherein the control module is configured to control the compressor, the first valve, and the second valve based on the signal received from the utility provider.

5. The system of claim 4, wherein the control module is configured to operate the system in a first mode and in a second mode, wherein a capacity of the compressor is higher in the first mode than in the second mode, and wherein the control module switches between the first and second modes based on the signal received from the utility provider.

6. The system of claim 5, wherein the compressor is shut down in the second mode.

7. The system of claim 5, wherein the compressor operates at a partial capacity in the second mode.

8. The system of claim 5, wherein, in the first mode, the control module is configured to:
    move the first valve to restrict fluid flow through the first flow-path, and move the second valve to the open position to allow fluid flow through the second flow-path.

9. The system of claim 8, wherein, in the second mode, the control module is configured to:
move the first valve to the open position allow fluid flow through the first flow-path, and
move the second valve to restrict fluid flow through the second flow-path.

10. The system of claim 9, wherein the heating-fluid circuit includes a third valve that is movable between a first position allowing fluid flow through the heat-exchanger conduit and a second position restricting fluid flow through the heat-exchanger conduit, wherein the control module is configured to switch the system to a third mode in which the third valve is moved to the second position.

11. The system of claim 10, wherein the control module is configured to move the first and second valves to the open position in the third mode.

12. The system of claim 11, wherein the heat-exchanger conduit is in a heat-transfer relationship with an enclosed space such that fluid flowing through the heat-exchanger conduit transfers heat to the enclosed space, and wherein the control module is configured to switch the system to the third mode in the absence of a heating demand for the enclosed space and when a temperature of fluid in the fluid storage tank is below a predetermined temperature.

13. The system of claim 1, wherein the heating-fluid circuit includes a pump that circulates fluid through the heating-fluid circuit.

14. The system of claim 1, wherein the heat-exchanger conduit is in a heat-transfer relationship with an enclosed space such that fluid flowing through the heat-exchanger conduit transfers heat to the enclosed space.

15. The system of claim 14, wherein the enclosed space is a universal holding cabinet configured to contain pre-cooked food products to maintain the food products at a serving temperature.

16. A method of operating a system for heating an enclosed space, the system including a heat-pump circuit and a heating-fluid circuit that is in a selective heat-transfer relationship with the heat-pump circuit, the method comprising:
operating the system in a first mode in which the heat-pump circuit operates at a first capacity and fluid in the heating-fluid circuit absorbs heat from working fluid in the heat-pump circuit, wherein fluid in the heating-fluid circuit is fluidly isolated from working fluid in the heat-pump circuit;
receiving a signal from a utility provider indicative of a period of demand for electrical power in a power grid;
switching the system from the first mode to a second mode in which power consumption of the heat-pump circuit is reduced and at least a portion of the fluid circulating in the heating-fluid circuit bypasses a condenser of the heat-pump circuit and flows through a fluid storage tank of the heating-fluid circuit; and
directing fluid in the heating-fluid circuit through a heat-exchanger conduit during the first mode and during the second mode, wherein the heat-exchanger conduit is in a heat-transfer relationship with the enclosed space.

17. The method of claim 16, wherein the heating-fluid circuit includes:
a first flow-path including a first valve and a fluid storage tank, the first valve is movable between an open position allowing fluid flow through the first flow-path and a closed position restricting fluid flow through the first flow-path; and
a second flow-path including a second condenser conduit and a second valve, the second condenser conduit is in a heat-transfer relationship with a first condenser conduit of the heat-pump circuit, the second valve is movable between an open position allowing fluid flow through the second flow-path and a closed position restricting fluid flow through the second flow-path.

18. The method of claim 17, wherein the second valve is in the open position when the system is operating in the first mode.

19. The method of claim 18, wherein the first valve is in the open position when the system is operating in the second mode.

20. The method of claim 19, wherein the second valve is in the closed position when the system is operating in the second mode, and wherein the first valve is in the closed position when the system is operating in the first mode.

21. The method of claim 19, wherein switching the system to the second mode includes shutting down a compressor of the heat-pump circuit.

22. The method of claim 19, wherein switching the system to the second mode includes operating a compressor of the heat-pump circuit at a lower capacity than a capacity at which the compressor operates in the first mode.

* * * * *